United States Patent [19]

Strametz

[11] 4,158,318

[45] Jun. 19, 1979

[54] CAM REMOVING TOOL

[76] Inventor: William A. Strametz, 897 State Rd. 427, Longwood, Fla. 32750

[21] Appl. No.: 870,659

[22] Filed: Jan. 19, 1978

[51] Int. Cl.[2] ............................................ B23P 19/04

[52] U.S. Cl. ........................................ 81/3 R; 29/256

[58] Field of Search ................. 29/215, 217, 219, 244, 29/256; 81/3 R, 1 R

[56] References Cited

U.S. PATENT DOCUMENTS

| | | | |
|---|---|---|---|
| 2,128,659 | 8/1938 | Mintz | 29/256 X |
| 2,563,382 | 8/1951 | Taylor | 29/219 |
| 3,979,811 | 9/1976 | Kammeraad | 29/215 |

*Primary Examiner*—James G. Smith

*Attorney, Agent, or Firm*—Duckworth, Hobby, Allen & Pettis

[57] ABSTRACT

An internal combustion engine cam removing tool for holding rocker arms off the cam during removal of the cam. The tool includes cylinder head support and tool attaching brackets connected through the bores for bolting the cylinder head to the engine to lock the tool to the cylinder head. The tool has a plurality of rocker arm holding members attached to a frame for pushing and holding each rocker arm against the bias of the valve spring while the cam is being removed by a mechanic, thus simplifying the handling of the cylinder head and the removal of the cam.

7 Claims, 4 Drawing Figures

CAM REMOVING TOOL

BACKGROUND OF THE INVENTION

The present invention relates to tools for working on engines and especially to a tool for removing a cam from an internal combustion engine of the type having an overhead cam shaft mounted in a cylinder head for driving rocker arms for actuating the engine valves.

In the past, various types of tools have been provided for compressing valve springs in order to remove the valve springs so as to get the valves out of the cylinder head or out of the engine block, and these generally provide a tool which can be braced against the engine block or cylinder head. Typical prior U.S. Patents for removing engine valves can be seen in U.S. Pat. No. 3,527,555 for a mechanism for removing and replacing valves and in U.S. Pat. No. 2,563,382 for a combined cylinder head stand and valve spring compressor and in U.S. Pat. No. 2,524,949 for a valve removing mechanism. Other valve removing tools include U.S. Pat. Nos. 2,173,398 and 2,056,329. One prior U.S. Pat. No. 3,979,811 shows an overhead cam shaft and valve train insertion and removal tool which attaches to a cylinder head.

The present invention, on the other hand, is directed towards a tool for removing the cam from a BMW manufactured engine having one or more overhead cam shafts for driving rocker arms which actuate the valves, and in which it is difficult to remove the cams without removing the rocker arms, inasmuch as all the rocker arms must be depressed simultaneously in order to remove the cam without damage from the rocker arms. The tool is used on the engines of only BMW manufactured heads, but is adapted to be attached to all the cylinder heads of the manufacture. The tool can be connected to the cylinder head while providing a base for the cylinder head with each rocker arm being pushed off the cam to allow the mechanic to remove or replace the cam.

SUMMARY OF THE INVENTION

The present invention relates to a tool for removing an engine cam from a particular type of overhead cam engine and has a main frame member which is attached to the cylinder head of the engine through the bores for attaching the cylinder head to the block with a cylinder head support member, which will support the head while working thereon. The tool frame has a plurality of slots with a rocker arm drive member attached therethrough to a rocker arm engaging member which engages the rocker arm in a manner not to damage the rocker arm. The rocker arm drive member drives the rocker arm against the valve spring to lift the rocker arm off the cam.. The drive member is held to the main frame with a sliding support that allows it to be adjusted for different engines.

BRIEF DESCRIPTION OF THE DRAWINGS

Other objects, features, and advantages of the present invention will be apparent from the written description and the drawings, in which.

DESCRIPTION OF THE PREFERRED EMBODIMENT

Figure 1:
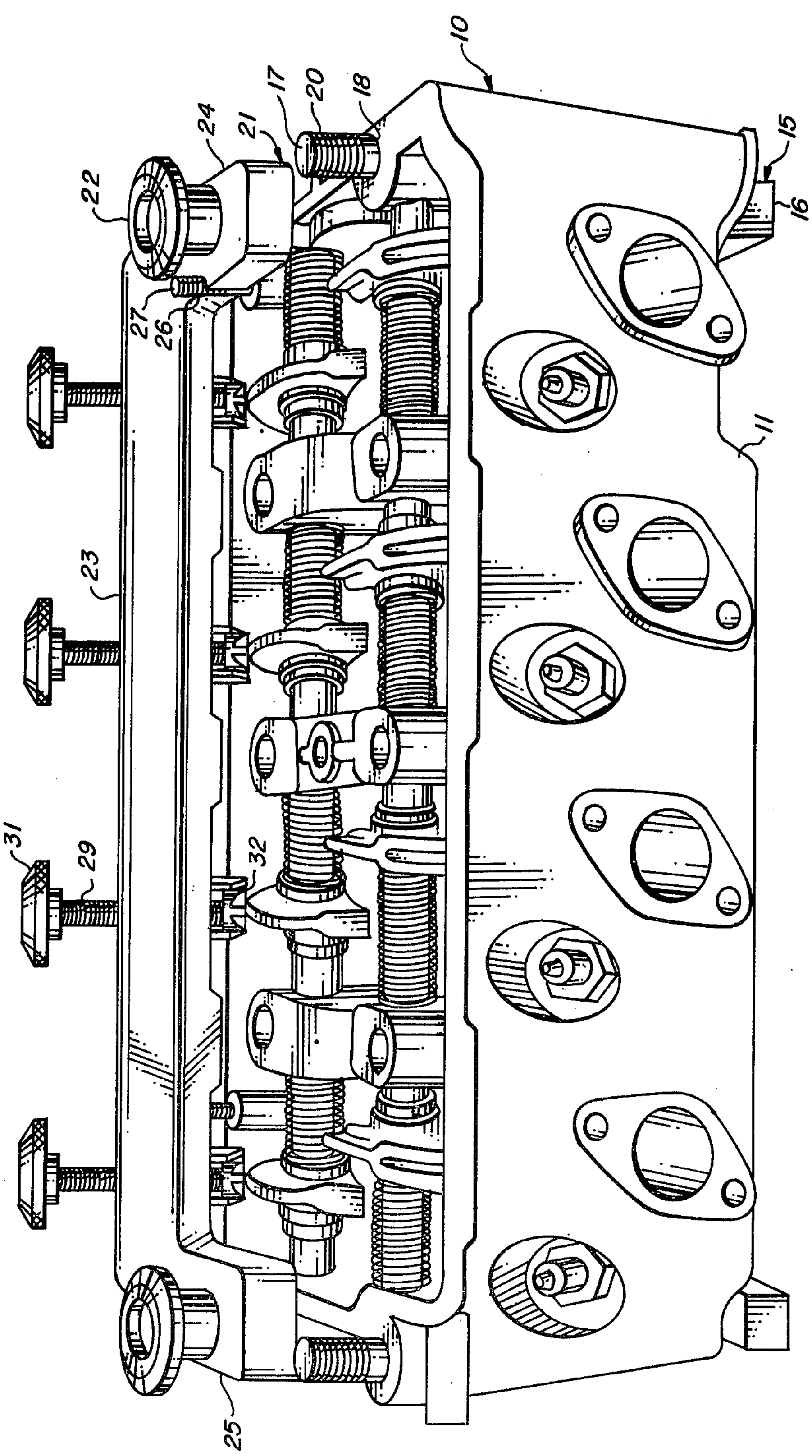
FIG. 1 is a perspective view of an engine cylinder head having a tool in accordance with the present invention attached thereto.

Referring to the drawings, and especially to FIG. 1, an engine cylinder head 10 of the type that fits a vehicle internal combustion engine is illustrated having a cylinder head casting 11 with a pair of rocker arm assembly shafts 12 mounted thereon having a plurality of rocker arms 13, attached to each shaft. The engine cam removing tool 14 is shown mounted to the cylinder head 10 by the cylinder head support members 15, which have base support portions 16, with a pair of rods 17 threaded on the end connected to each base 16. The shafts 17 are passed through openings 18 in the cylinder head casting 11 which are the same openings for attaching the cylinder head to the block of the engine. Each shaft 17 with its threaded tip 20 can pass through the main frame 21 of the cam removing tool 14 and can attach the frame 21 with a handle 22 having an internally threaded nut portion, which attaches to the threaded portion 20 of the shaft 17 for locking the frame 21 to the cylinder head 10 on each end of the cylinder head. A pair of frame members 21 can be attached to each side of the cylinder head 10 for acting on the rocker arms 13 located on each of the rocker arm assembly shafts 12. The frame 21 is generally U-shaped, having an elongated portion 23 and a pair of short arms 24 and 25 with bores passing through each arm for passing the shafts 17 through.

A notched portion 26 allows the protrusion of a threaded stud 27. The elongated frame portion 23 has a plurality of slots 28 which may be seen in FIGS. 2 and 3 passing therethrough, and each slot has mounted therein a threaded rocker arm drive member 30 having a handle 31 fixedly attached thereto on one end, and a rocker arm engaging member 32 attached on the other end of the shaft 29, and on the other side of the frame 21. The shaft 29 is threadedly attached through the slots 28 through a slidably mounted internal threaded drive member support 33, which allows each shaft 29 to be moved horizontally short distances for adjusting for different cylinder heads.

The operation of the tool is accomplished by removing the cylinder head from the engine and replacing the cylinder head supports 15 through the bores for the cylinder head bolts and placing the tool frames 21 over the protruding shafts 17 and attaching the nuts 22 to each frame 21 to lock the frame in place on the cylinder head. The cylinder head may then be placed on a table and supported by the base 16 of the cylinder head support 15 while the cylinder head is being worked on. The tool may also be mounted to the cylinder head while the cylinder head is still attached to the engine by placing the short arms 24 and 25 over the studs for the cylinder head cover and attaching the handles 22 thereon. Each rocker arm drive shaft 29 has been aligned with each rocker arm, allowing the rocker arm engaging member 32 to slip into a yoke in the rocker arm which allows the handle 31 to be rotated, threading the drive shaft 29 through the slidably mounted internally threaded drive support member 33 to push the rocker arm against the valve steam, thereby lifting the rocker arm off of the cam shaft located in the cylinder head. When all of the rocker arm drive members 30 have been tightened to lift all of the rocker arms, the cam shaft can be removed from the cylinder head by the mechanic.

Figure 2:
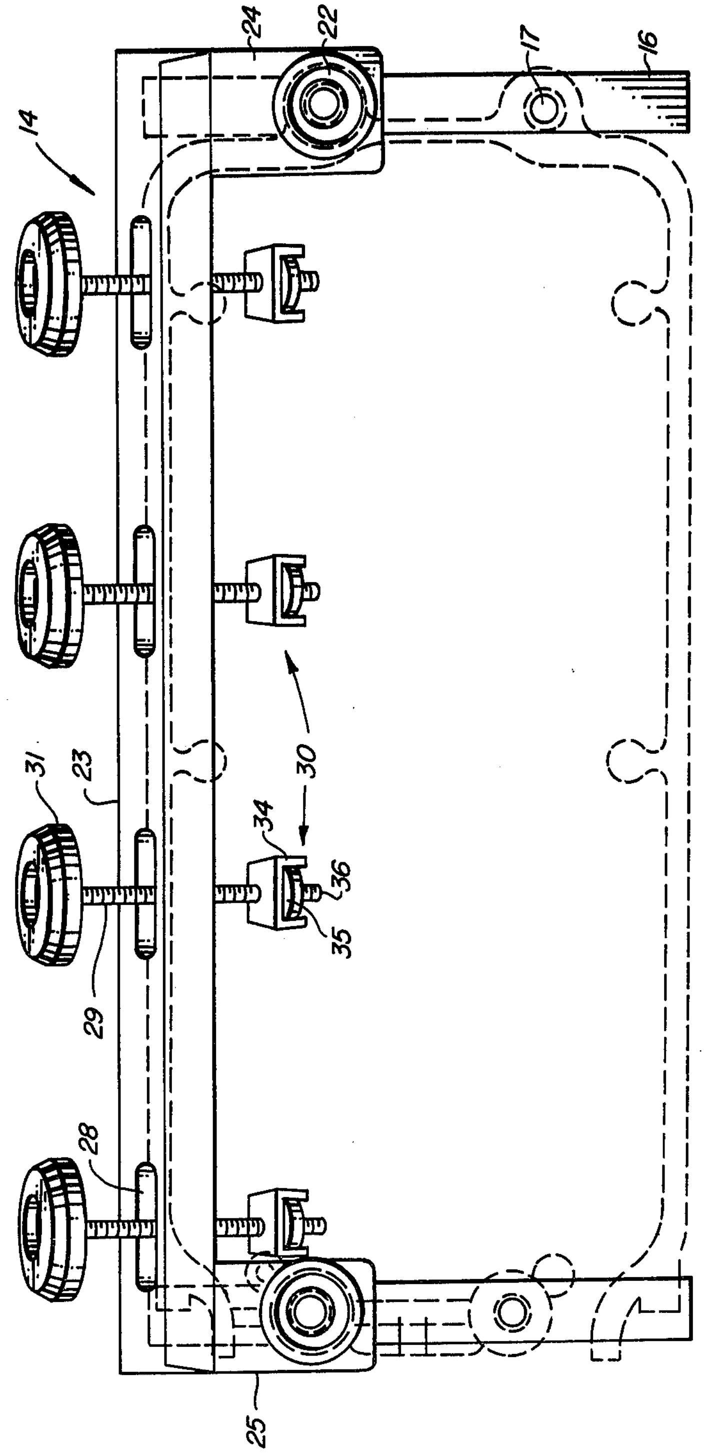
FIG. 2 is a top perspective view of the complete cam removing tool of FIG. 1.
Figure 4:
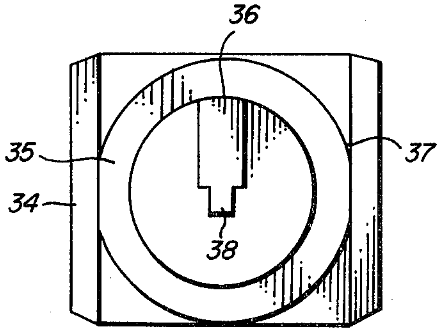
FIG. 4 is a sectional view of the rocker arm engaging member for the tool of FIGS. 1 through 3.

The rocker arm engaging member 30, as illustrated in FIG. 2, has a bracket portion 34 for the drive member shaft 29 to be rotably attached to, and has a sliding plate 35 mounted therein, having a rocker arm yoke engaging protrusion 36 mounted thereto, so that rotating the shaft 29 will rotate the bracket 34, but once the yoke engaging portion 36 is protruded into the yoke of the rocker arm, the sliding support 35 will slip in the bracket 34. The operation is more clearly illustrated in connection with FIG. 4, which has the bracket 34 with the sliding platform in slots 37, with the protruding portion 36 protruding therefrom. The protruding portion 35 has a slightly notched portion 38.

Figure 3:
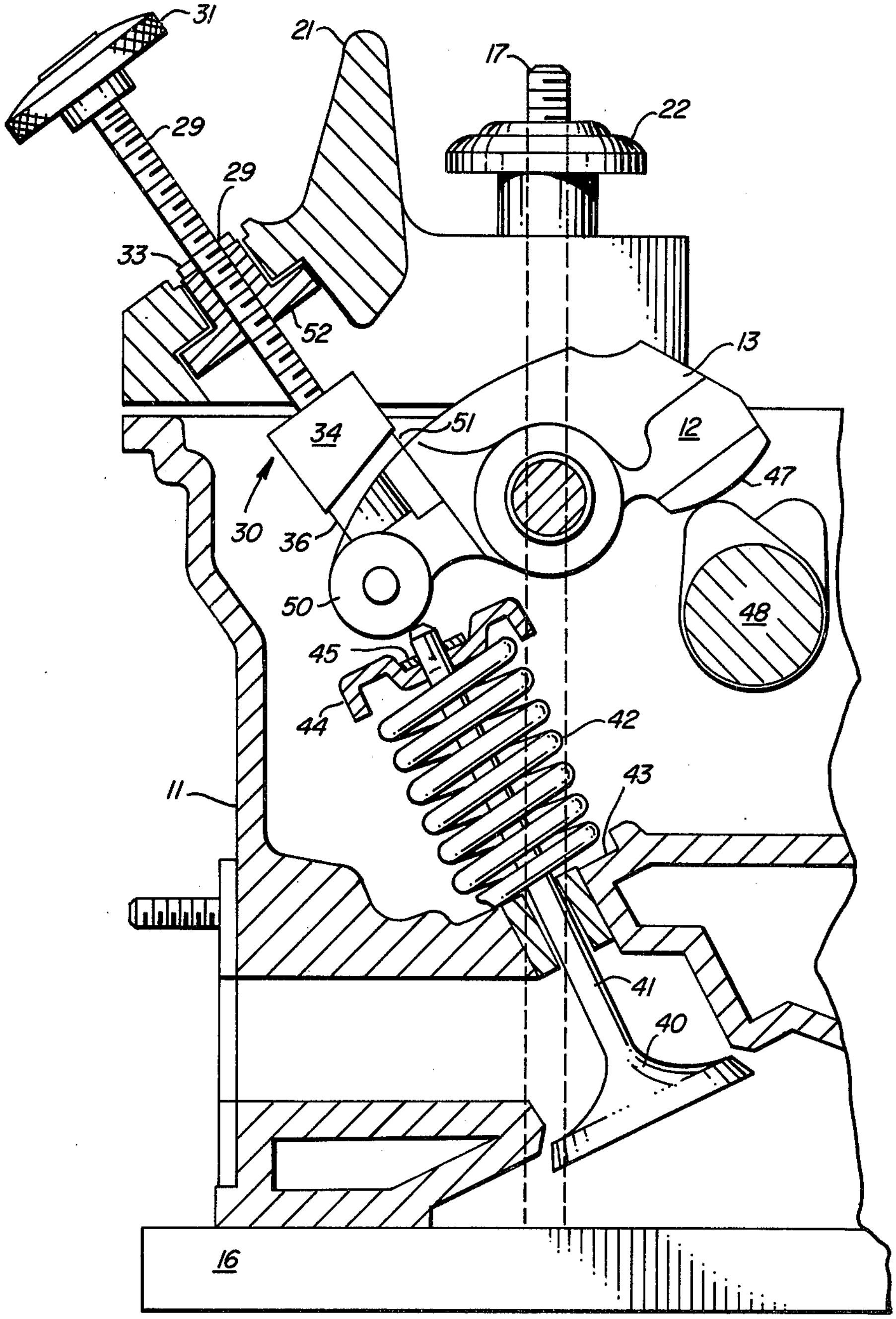
FIG. 3 is a sectional view of the tool mounted on a cylinder head.

In FIG. 3, the cylinder head 11 is illustrated in a sectional view having a valve 40 connected to a valve stem 41 and having a valve spring 42 mounted therein and compressing against a surface 43 of the cylinder head 11 at one end and against a valve spring seat 44 at the other end, which is supported by a valve locking clip 45, held in a small annular groove 46 on the valve stem 41. The rocker arm 13 is seen connected to the rocker arm assembly shaft 12 and has a cam following portion 47 on one end following a cam 48 in the engine and a valve stem follower portion 50 mounted to the other side following the tip of the valve stem 41. The slot 36 is seen located in a yoke 51 on the rocker arm 13. FIG. 3 also has a handle 31 connected to the drive member 30 passing through the slidably mounted internal threaded drive member support 28, supported against the frame 21 with ledges 52 and held by spring clips or other types of fasteners desired with the frame 21 being held to the cylinder head 11 by the protruding shafts 17 anchored with the nuts 22 and protruding through bores in the cylinder head support member 16.

The operation of the tool as illustrated allows all of the rocker arms of the cylinder head to be held simultaneously while removing the cam shaft and maintaining a convenient work support for the cylinder head to prevent damage to the cylinder head and valves. The components can be made of any material desired, but a high strength steel or stainless steel for the frame 21, the base of the cylinder head support 16, the shafts 17, as well as handles 31 and nut 22 is preferred. The steel can be polished, chrome plated or stainless and will work with the head on or off the engine. Accordingly, the present invention is not to be construed as limited to the particular forms disclosed herein, which are to be regarded as illustrative rather than restrictive.

I claim:

1. A tool for holding the rocker arms of an engine off a cam during removal of the cam comprising in combination:

a frame;

cylinder head attaching means for removably attaching said frame to a cylinder head;

a plurality of rocker arm drive members movably attached to said frame each said rocker arm drive member being slidably mounted through said frame for adjusting the position of said rocker arm drive member; and a rocker arm engaging member attached to each said rocker arm drive member for engaging a rocker arm, whereby said rocker arm drive member is adapted to drive said rocker arm engaging member to force said rocker arm off an engine cam so that the cam can be removed from the cylinder head of the engine.

2. The apparatus in accordance with claim 1, in which said cylinder head means includes a plurality of shafts attached through the cylinder head bolt openings.

3. The apparatus in accordance with claim 2, in which the cylinder head attaching means includes base support members for supporting the cylinder head and being fixedly attached to said elongated shafts passing through bores in said cylinder head.

4. The apparatus in accordance with claim 3, in which said cylinder head attaching means includes a plurality of threaded attaching members for attaching said frame to said protruding shafts of said cylinder head attaching means.

5. The apparatus in accordance with claim 4, in which each rocker arm drive member has a handle thereon and a threaded shaft passing through a slidably mounted internally threaded drive member support mounted to a slot in said frame.

6. The apparatus in accordance with claim 5, in which said rocker arm engaging member includes a drive member connected portion rotatably connected to each said rocker arm drive member and a sliding portion, said sliding portion having a yoke engaging portion protruding therefrom, whereby rotation of each rocker arm drive member will allow said rocker arm engaging member to remain in the same position engaging each rocker arm as said rocker arm is lifted off an engine cam.

7. The apparatus in accordance with claim 6, in which said frame is an elongated frame with a pair of protruding arms protruding therefrom, each said protruding arm having an aperture therethrough for connecting a shaft of said cylinder head attaching means through.

* * * * *